March 14, 1939.  C. B. LANSING  2,150,381
STONE SAWING MACHINE
Filed Feb. 7, 1938
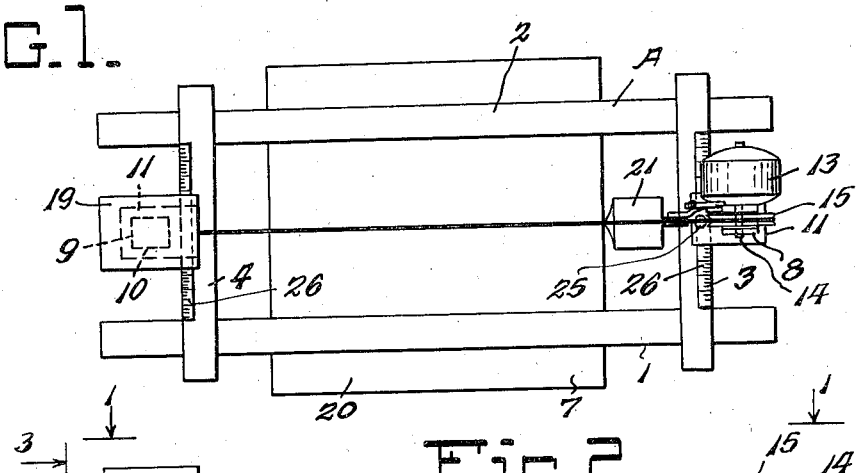
Inventor
CHARLES B. LANSING.
By Robb＆Robb
ATTORNEYS Patented Mar. 14, 1939

2,150,381

UNITED STATES PATENT OFFICE 2,150,381

STONE SAWING MACHINE

Charles B. Lansing, Gates Mills, Ohio

Application February 7, 1938, Serial No. 189,195

3 Claims. (Cl. 125—21)

This invention relates to stone sawing machines of the type employing endless wire means adapted to bear against and wear away the material to be cut, which is commonly utilized in conjunction with an abrasive substance directed to the point of contact of the cutting wire with the material to be cut.

It is an object of the invention to provide a cutting device of the type generally described above, of simple construction, readily portable, and which may be secured to a block of material to be cut, so that the latter acts as a support for the device during the cutting operation.

In carrying out the invention I provide a horizontal frame adapted to extend over and be secured to a block of the material to be cut, which frame has associated therewith vertical supports movable up and down with respect to the frame, and provided with pulleys over which an endless wire is trained. One of the supports carries a motor or other source of power for rotating one of the pulleys and thereby imparting movement to the endless means, and the other of said supports carries a weight serving as a counter-balancing means whereby to enable the supports to move downwardly corresponding distances at the same time, as the cutting operation progresses.

The cutting function is accomplished by the action of the moving endless wire upon the material to be cut, in conjunction with the bearing force imparted to said endless means, by reason of the weight of the supports, which includes, in the case of one of them, the motor or other source of power carried thereby, and, in the case of the other, the counterbalancing weight.

The invention is now to be particularly described in connection with the drawing, in which—

Figure 1 is a top view of a device of the present invention, showing it in position for the cutting operation upon a block of stone.

Figure 2 is a side view of said device.

Figure 3 is an end view looking in the direction of the arrows 3—3 of Figure 2.

The letter A generally designates the frame of the device, which comprises two longitudinal members, 1 and 2, which are connected near their ends with transverse members 3 and 4. The longitudinal members 1 and 2 are provided at the undersides thereof with opposing angle clamping brackets 5, two of which are provided on the underside of each longitudinal member. Said angle brackets are provided with adjustable clamping members 6 whereby the brackets may be clamped at opposite sides of a slab of stone or other material to be cut, such as indicated at 7.

Bearing members 11 are slidably mounted for longitudinal adjustment respecting said transverse members 3 and 4. For this purpose a groove and tongue connection is employed, the tongue portions 23 of the transverse members fitting the grooves 24 of the bearing members. The bearing members are provided with clamping bolts 25 and said transverse members are marked with corresponding indicia 26 for enabling adjustments of the bearing members to corresponding portions on the transverse members.

Mounted upon the support 8 is a bracket 12 to which is secured an electric motor 13 which is drivingly connected by a shaft 14 to pulley 15. Pulleys 16 are provided at the lower ends of the supports 8 and 9 and near the upper end of the support 9. Trained over said pulleys 15 and 16 is an endless wire 17. Said wire 17 may also be trained over a pulley 18 which may be pivotally connected with the support 8, as shown, or have spring connection with the said support 8 so as to provide automatic tensional adjustment for the endless wire 17 to maintain the said wire upon the pulleys 15 and 16.

A counterbalancing weight 19 is provided on the support 9 to counterbalance the weight of the motor 13 on the support 8 so that the supports may be enabled to move downwardly equal distances at the same time, as the cutting operation progresses.

In operation the frame A is secured to a block of stone 7 so that the said frame is horizontally disposed with respect thereto and above the said block. The opposing clamping brackets 5, which are adjustable longitudinally of the frame members 1 and 2, are adjusted so as to abut the opposing faces of the block of stone, and the clamping members 6 are then tightened to rigidly secure the frame to the block. The supports 8 and 9 have previously been raised so that the wire 17 bears against the upper face 20 of the block of stone, and the motor 15 is then started into operation to impart movement to the wire 17, which then wears against the stone. The weight of the supports 8 and 9 carrying the wire 17, by reason of the weight of the motor 15 carried by the support 8 and the counterbalancing weight 19 carried by the support 9, causes the wire 17 to bear against the block of stone with considerable pressure.

As the cutting operation progresses, by reason of the movement of the endless wire 17 in wearing away the stone, the supports move downwardly by gravity so as to constantly maintain the bearing pressure of the endless wire 17 upon the stone. As previously mentioned, the supports 8 and 9 move downwardly, under the force of gravity, substantially corresponding degrees because of the fact that the weight of each support is the same.

In conjunction with the cutting operation performed by the wearing action of the endless wire, it may be desirable to provide for the feeding of an abrasive substance such as a mixture of sand and water to the point of contact of the said wire with the stone during the cutting operation. For this purpose a container such as indicated at 21, containing such abrasive substance, may be provided with a down spout 22 directed to the point of contact of the wire with the stone. The container may be separate from the device of the invention, or it may be attached in any suitable manner to the frame or one of the supports to move with the latter and thereby continuously supply the abrasive mixture at the desired point.

Having thus described my invention, what I claim as new and desire to secure by Letters Patent of the United States, is—

1. In a device of the class described, in combination, a frame, vertical supports guidingly associated with said frame, pulleys carried by said supports, an endless member trained over said pulleys and adapted to bear against said material, means carried by one of said supports for driving said endless means, and counterbalancing means carried by another of said supports for enabling said supports to move downwardly correspondingly respecting time and distance by gravity as the cutting operation progresses.

2. In a device of the class described, in combination, a frame adapted to rest on the stone or work to be cut, cutting means vertically movable respecting said frame, and means for guiding said cutting means in its vertical movement, said cutting means being movable downwardly respecting said frame as the cutting operation progresses, and members supporting said guiding means on the frame horizontally adjustable respecting said frame.

3. In a stone sawing machine, in combination, a frame comprising spaced longitudinal and horizontal members adapted to rest upon the stone to be cut, cross members carried by said horizontal members, stone engaging clamping members also carried by said horizontal members to secure the same rigidly to the stone to be operated on by cutting means, vertical guiding means mounted upon the cross members aforesaid, cutting means operating about said vertical guiding means so as to be removable vertically and fed by the guiding means to the stone for cutting action thereon, and supporting members for said vertical guiding means arranged to slide horizontally along the cross members of the frame, whereby said guiding means may be adjusted in a horizontal direction to bring the cutting means to new positions for cutting work upon the stone to which the frame is clamped or secured.

CHARLES B. LANSING.